Figure 1:
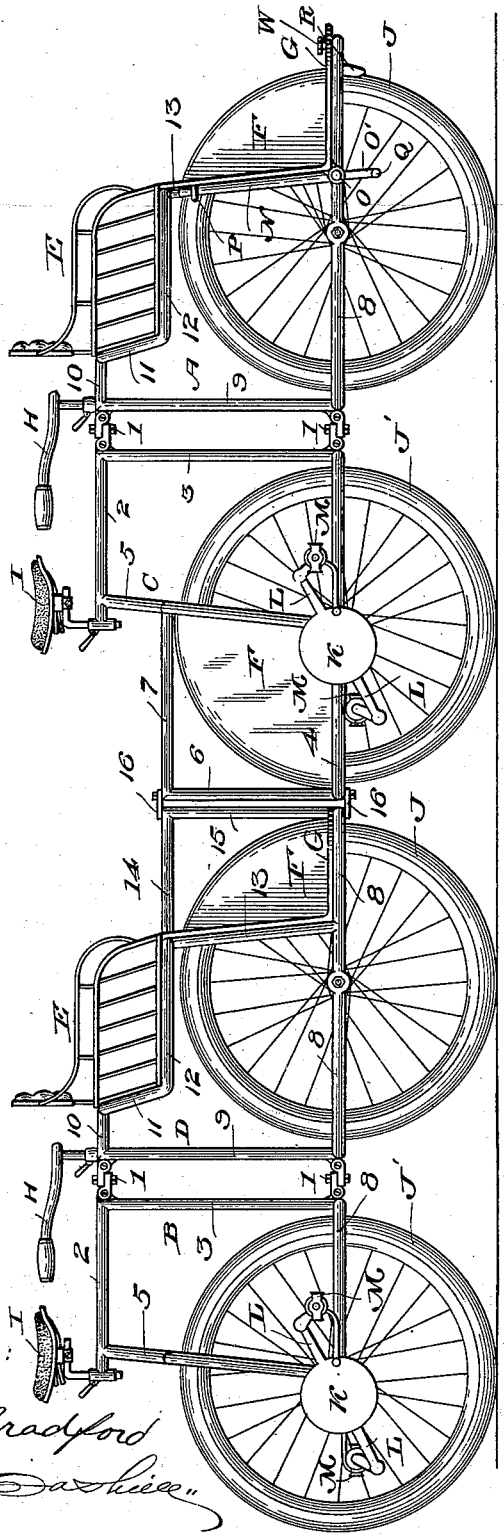

No. 647,789. Patented Apr. 17, 1900.
J. C. ANDERSON.
MULTICYCLE CAB.
(Application filed Aug. 25, 1899.)
(No Model.) 2 Sheets—Sheet 1.

WITNESSES:
Edwin L. Bradford

INVENTOR
Jas. C. Anderson
BY
ATTORNEY

THE NORRIS PETERS CO., PHOTO-LITHO., WASHINGTON, D. C.

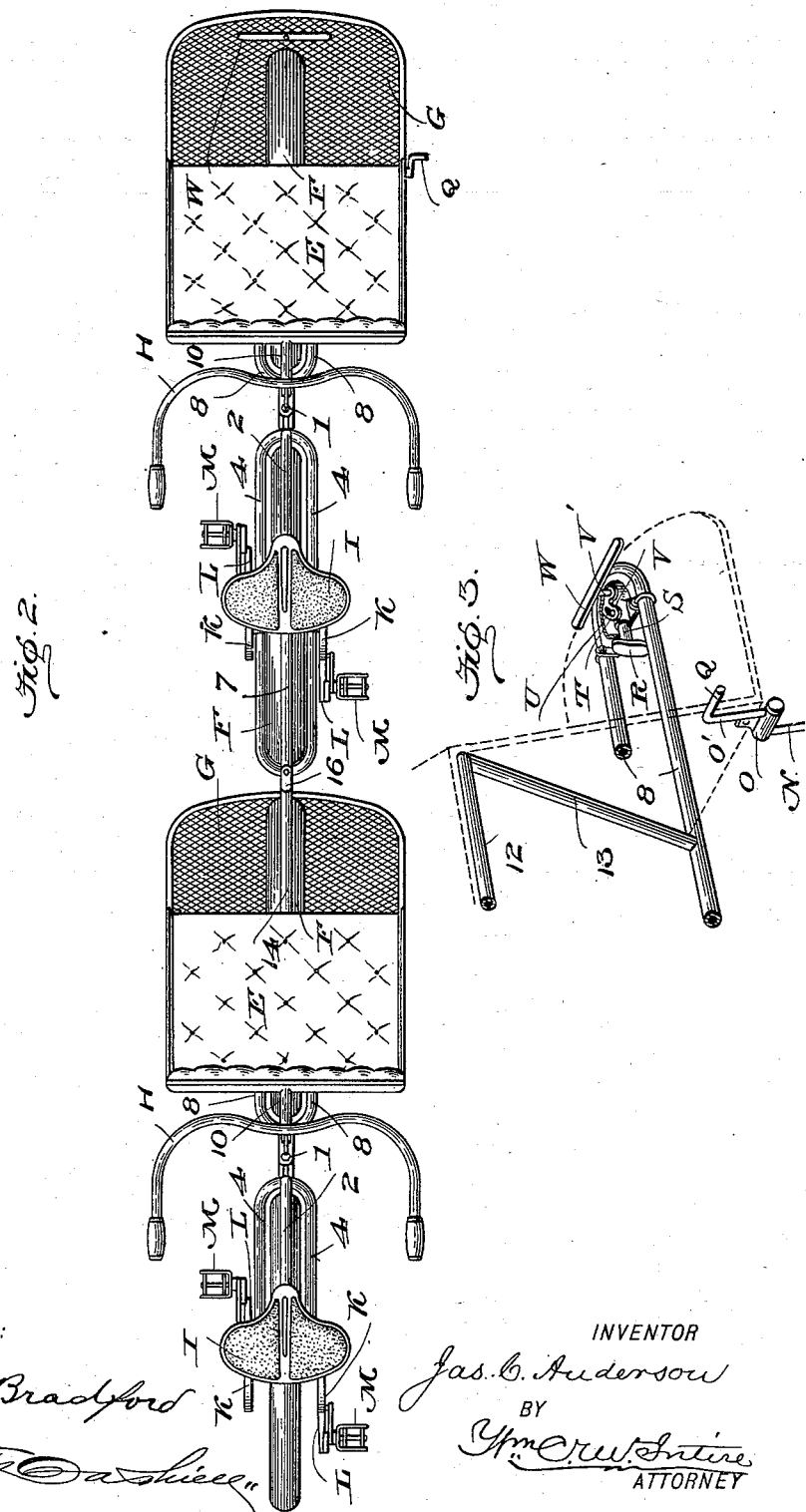

UNITED STATES PATENT OFFICE.

JAMES C. ANDERSON, OF HIGHLAND PARK, ILLINOIS.

MULTICYCLE-CAB.

SPECIFICATION forming part of Letters Patent No. 647,789, dated April 17, 1900.

Application filed August 25, 1899. Serial No. 728,442. (No model.)

*To all whom it may concern:*

Be it known that I, JAMES C. ANDERSON, a citizen of the United States, residing at Highland Park, in the county of Lake and State of Illinois, have invented certain new and useful Improvements in Multicycle-Cabs; and I do hereby declare the following to be a full, clear, and exact description of the invention, such as will enable others skilled in the art to which it appertains to make and use the same.

My invention relates to certain new and useful improvements in cycle construction, and particularly to that class illustrated and described in another application filed by me on the 19th day of August, 1899, Serial No. 727,836, and denominated a "cycle-cab."

In the pending application above referred to I have shown and described a vehicle consisting of a frame mounted centrally upon a single carrying-wheel and provided with a passenger-seat directly over the wheel and with rigidly-adjustable handle-bars in rear of the seat, said frame articulatively connected with and propelled through the medium of a trailing frame carrying a driving-wheel and propelling mechanism.

My present invention has for its object to so modify the construction above referred to that the carrying capacity and motive force may each be increased or multiplied and the machine as a whole adapted to be supported in vertical position when all the riders are dismounted and during the time they are mounting and preparing to start the machine; and with these ends in view my invention consists in the details of construction and arrangement hereinafter described, reference being had to the accompanying drawings, in which—

Figure 1 is a side elevation of a vehicle embodying my invention. Fig. 2 is a top or plan view of the same; and Fig. 3 is a detail perspective view, on an enlarged scale, showing supports and brakes connected with the passenger-frames and by means of which the machine as a whole may be supported in vertical position.

Similar letters and numerals of reference denote like parts in the several figures of the drawings.

In the pending application hereinbefore referred to two frames only are used, and in my present application the frames A and B represent, respectively, the front and rear frames of the said construction. These two frames are capable of being articulatively connected by the double-pivoted joint 1 to constitute the cycle-cab; but when it is desired to increase the carrying capacity of such a cab I provide a propelling-section C and a trailing section D, adapted, as will be described, to couple up with and intermediate of the sections A and B.

In order that the intermediate sections C and D may be coupled together and with the sections A and B, I construct the frame of the propelling-section C with an upper horizontal tube 2, a front vertical tube 3, a lower horizontal double fork 4, and a rear and slightly-oblique fork 5. At the juncture between the tubes 2 and 3 and the latter with the front end of the double fork 4 suitable lugs are provided for making a pivotal connection with the articulative joints 1 1. The rear end of the fork 4 connects with a comparatively-short vertical tube 6, which at its upper end is connected through a horizontal tube 7, parallel with the fork 4, to the tube 5. The intermediate cab-section D is formed substantially as shown in the pending application herein referred to and of a lower double fork 8, a vertical rear tube 9, an upper horizontal tube 10, lateral and oblique branches 11, parallel forwardly-extended tubes 12, and vertical and slightly-oblique and converging tubes 13, connected at their lower ends to the two side tubes of the fork 8 forwardly of the center, the parallel upper tubes at the angles of juncture with the tubes 11 and 12 and 12 and 13 being connected by cross-tubes and constituting a support for the passenger-seat E. The rear vertical tube 9 is provided with lugs at the upper and lower ends, adapted to connect with the pivotal joint 1, all as fully explained in the application hereinbefore referred to.

From the center of the cross-tube at the angle of juncture between tubes 12 and 13 is a forwardly-projecting tube 14, which is connected and braced by a vertical tube 15, connected therewith and with the front ends of the double fork 8. The upper and lower ends of the vertical tube 15 are formed or provided with lugs 16, adapted to be pivotally connected with the rear tube 6 of the propelling-frame C, as clearly shown, and the frames A and D are provided with shields or mud-guards F and footboards G, all as shown and described in the pending application heretofore referred to, and the frame C is also provided with a shield F over the rear upper quadrant of the driving-wheel for the purpose of protecting the passenger upon the seat E on the frame D and at the same time give harmony and uniformity of design.

Each passenger-frame is provided with a rigidly-adjustable handle-bar H and each propelling-section with a saddle I, and the several frames are mounted vibratively upon wheels J and J', the former being merely supporting and carrying wheels, while the latter are driving-wheels connected with gears K, cranks L, and extension-pedals M.

In order that the machine as a whole may be held in vertical position when at a state of rest while the passengers and driver are dismounting or mounting or for any other reason it may be desirable, I provide each passenger-section with supporting legs or props N, which are pivoted to the end of extension-tubes O of such length that the props N when in their folded position, as shown at Fig. 1, will be sustained by spring-clips P near the upper ends of the oblique tubes 13. These props N extend below their pivotal points with the extensions O and are returned at right angles, as shown at Q, to constitute a step upon which the passenger's foot may be placed to manipulate the props N, either to release them from the clips P (which may also be done by hand) or to throw them upwardly into their passive position, as shown at Fig. 1.

In order that the machine shall not move accidentally after the props have been adjusted to hold the machine in equilibrium, I provide foot-brakes R, substantially as described in another pending application filed by me on the 9th day of August, 1899, Serial No. 726,694, for improvement in bicycles for use in the military service and consisting of a brake-plate secured to the end of a reciprocating shank S, having a diametric pin T, one end extending through and working in a longitudinal slot in the housing and the other end extending into and working within a cam-seat U, in a radial arm V, extending from a rock-shaft V', at right angles to the brake-plate shank, all as clearly shown at Fig. 3 and as fully described in the application above referred to. This brake mechanism is secured in position upon the front end of the fork 8 of the front section of the frame, and the rock-shaft V', which operates the cam-slotted arm V, extends a suitable distance above the footboard and is provided with a walking-beam lever or operating-disk W, which may be operated by either or both feet of the passenger occupying the front seat. The brake may thus be used to retard the movement of the machine by a partial rotation of the rock-shaft and consequent traverse of pin T in the slot U, or the brake may be tightly set against the tire of the wheel by rocking the shaft to its full limit and until the pin T assumes a position, as shown, in line with the axis of the rock-shaft. When in this position, the riders may dismount from the machine, which will be sustained by the props before referred to, and the brake will prevent any change of relation between the machine and the props. After mounting the machine the passenger-rider rotates the rock-shaft of the brake through the medium of the lever or disk W, whereupon the driving rider or riders start the machine, and the props by reason of their pivotal connection trail until such moment when the passenger-rider has an opportunity to force them into their upper and locked position, as heretofore described. These brakes may be placed upon any one or more of the frames in an obvious manner.

From the construction and arrangement shown it will be seen that the frames C and D may be removed by releasing and withdrawing the vertical pivots or pintles of the joints 1 and the frames A and B joined to constitute the cycle-cab described in the pending application referred to, and that such a cycle-cab may have its carrying and propelling capacity increased and multiplied by interposing any desired number of frames C and D, joined together in pairs between the section A and the section B, and that by reason of the articulative connection between the several frames each and all of them are adapted to vertical undulatory and sidewise snake-like motion, as fully described in another pending application filed by me on the 9th day of August, 1899, Serial No. 726,692, for improved "multicycle."

Having described the construction, operation, and advantages of my improved machine, what I claim as new, and desire to secure by Letters Patent, is—

1. In combination with the passenger section or frame A and the propelling section or frame B, provided with means for articulative connection to constitute when joined, a "cycle-cab," the propelling-section C formed with a rearwardly-extended frame composed of the members 4 and 7 connected by the vertical member 6; the passenger-section D, formed with a forwardly-projecting frame composed of the members 8 and 14 joined by a vertical member 15, articulative joints 16, between the extensions of frames or sections C and D, and said sections articulatively connected with the sections or frames A and B respectively substantially as and for the purpose set forth.

2. The driving or propelling section C provided with means for articulative connection with a forward passenger-section, and with a rearwardly-projecting frame composed of the members 4 and 7 connected by the vertical member 6, in combination with the passenger-section D, provided with means for articulative connection with a rear propelling-section and having a forwardly-projecting frame composed of the members 8 and 14 connected by the vertical member 15, and articulative connections 16, between said frame, and the rearwardly-projecting frame on the propelling-section, substantially as hereinbefore set forth.

3. In combination with the passenger and propelling sections connected together, vibratory gravity-props N, connected with the passenger-section for holding the same in equilibrium when at a state of rest, and means for raising and holding said props when the machine is in motion, and a foot-brake R and means for operating it also connected with the passenger-section to hold the latter in fixed relation with the sustaining-props when down, substantially as hereinbefore set forth.

In testimony whereof I affix my signature in presence of two witnesses.

JAMES C. ANDERSON.

Witnesses:
JENNIE G. BOOTH,
DANL. W. BONN.